(12) United States Patent
Shirai

(10) Patent No.: US 7,208,563 B2
(45) Date of Patent: Apr. 24, 2007

(54) CRYSTALLINE POLYESTER

(75) Inventor: Eiji Shirai, Wakayama (JP)

(73) Assignee: Kao Corporation, Tokyo (JP)

( * ) Notice: Subject to any disclaimer, the term of this patent is extended or adjusted under 35 U.S.C. 154(b) by 546 days.

(21) Appl. No.: 10/758,416

(22) Filed: Jan. 16, 2004

(65) Prior Publication Data

US 2004/0152813 A1 Aug. 5, 2004

(30) Foreign Application Priority Data

Jan. 21, 2003 (JP) .............................. 2003-012757

(51) Int. Cl.
*C08G 63/16* (2006.01)
*G03G 9/13* (2006.01)

(52) U.S. Cl. .................... 528/194; 528/302; 430/109.4

(58) Field of Classification Search ................ 528/194, 528/302; 430/109.4
See application file for complete search history.

(56) References Cited

U.S. PATENT DOCUMENTS

| | | | | |
|---|---|---|---|---|
| 6,383,705 | B2 * | 5/2002 | Aoki et al. .............. | 430/109.4 |
| 6,890,695 | B2 * | 5/2005 | Shirai et al. .............. | 430/109.4 |
| 6,998,212 | B2 * | 2/2006 | Shirai et al. .............. | 430/109.3 |
| 2001/0018157 | A1 | 8/2001 | Aoki et al. | |
| 2003/0039910 | A1 | 2/2003 | Shirai et al. | |
| 2003/0040585 | A1 | 2/2003 | Shirai et al. | |
| 2004/0068049 | A1 * | 4/2004 | Wintermantel et al. ..... | 524/589 |
| 2005/0147911 | A1 * | 7/2005 | Shirai et al. .............. | 430/109.4 |

FOREIGN PATENT DOCUMENTS

| | | |
|---|---|---|
| JP | 2001-222138 | 8/2001 |
| JP | 2002-284866 | 10/2002 |
| JP | 2002-287426 | 10/2002 |
| JP | 2002-328490 | 11/2002 |

* cited by examiner

*Primary Examiner*—Tae H Yoon
(74) *Attorney, Agent, or Firm*—Oblon, Spivak, McClelland, Maier & Neustadt, P.C.

(57) ABSTRACT

A crystalline polyester prepared by polycondensing an alcohol component comprising 1,6-hexanediol in an amount of 60% by mol or more, with a carboxylic acid component comprising fumaric acid in an amount of 60% by mol or more, wherein the crystalline polyester has a ratio of a softening point to the maximum peak temperature of heat of fusion is from 0.6 to 1.3, and wherein a tetrahydrofuran-soluble component of the crystalline polyester has a number-average molecular weight of from 1500 to 10000, and the crystalline polyester has a softening point of from 50° to 120° C.; a resin binder for a toner comprising the crystalline polyester; and a toner comprising the resin binder. The crystalline polyester can be used as a resin binder for a toner used, for example, for developing electrostatic latent images formed in electrophotography, electrostatic recording method, electrostatic printing method, and the like.

16 Claims, No Drawings

CRYSTALLINE POLYESTER

FIELD OF THE INVENTION

The present invention relates to a crystalline polyester which can be used as a resin binder for a toner used, for example, for developing electrostatic latent images formed in electrophotography, electrostatic recording method, electrostatic printing method, and the like, and a toner containing the crystalline polyester.

BACKGROUND OF THE INVENTION

For the purpose of improving the low-temperature fixing ability, which is one of the major problems to be solved in electrophotography for achieving high speed and miniaturization, resin binders for a toner, containing a so-called crystalline polyester and an amorphous resin have been known (Japanese Patent Laid-Open Nos. 2001-222138, 2002-284866, 2002-287426 and 2002-328490). According to these techniques, while the low-temperature fixing ability has been satisfied to a certain degree, higher functions and miniaturization have been increasingly desired over the years. Therefore, there has been earnestly desired a toner showing both more excellent low-temperature fixing ability and a paper non-sticking ability, which is usually a contradictory property, and its improvements for environmental stability and a suppressive ability of staining within the device have been earnestly desired as the measures for higher functions.

SUMMARY OF THE INVENTION

The present invention relates to:
(1) a crystalline polyester prepared by polycondensing an alcohol component comprising 1,6-hexanediol in an amount of 60% by mol or more, with a carboxylic acid component comprising fumaric acid in an amount of 60% by mol or more, wherein the crystalline polyester has a ratio of a softening point to the maximum peak temperature of heat of fusion is from 0.6 to 1.3, and wherein a tetrahydrofuran-soluble component of the crystalline polyester has a number-average molecular weight of from 1500 to 10000, and the crystalline polyester has a softening point of from 50° to 120° C.;
(2) a resin binder for a toner containing the crystalline polyester of item (1) above; and
(3) a toner containing the resin binder of item (2).

DETAILED DESCRIPTION OF THE INVENTION

All publications cited herein are hereby incorporated by reference.

The present invention relates to a crystalline polyester for obtaining a toner, for instance, having more excellent low-temperature fixing ability, paper non-sticking ability and further improved environmental stability and a suppressive ability of staining within the device; a resin binder for a toner, containing the crystalline polyester; and a toner containing the resin binder.

In the present invention, since the alcohol component in the crystalline polyester contains 1,6-hexanediol as a main component and the carboxylic acid component contains fumaric acid as a main component, the paper non-sticking ability and the environmental stability can be improved, and the staining within the device can be reduced without impairing the low-temperature fixing ability. Although not wanting to be limited by theory, the reasons therefor are deduced as follows. A high crystallinity is maintained by the combination of 1,6-hexanediol and fumaric acid, so that re-solidification after fixing is facilitated, whereby the paper non-sticking ability is improved and the softening point of the polyester can be lowered. Further, by the use of highly hydrophobic 1,6-hexanediol, a stable triboelectric charge can be maintained even under high-temperature, high-humidity conditions.

The crystalline polyester of the present invention has a very low softening point. In the case where the crystalline polyester is contained as the resin binder for a toner, the low-temperature fixing ability of the toner is remarkably improved. In other words, the crystalline polyester of the present invention preferably has a softening point of from 50° to 120° C., preferably from 60° to 100° C., more preferably from 70° to 90° C. Also, the crystalline polyester has a maximum peak temperature of heat of fusion of preferably from 50° to 120° C., more preferably from 60° to 100° C., even more preferably from 70° to 90° C.

A tetrahydrofuran-soluble component of the crystalline polyester of the present invention has a number-average molecular weight of from 1500 to 10000, preferably from 2000 to 8000, more preferably from 2500 to 5000, from the viewpoints of restricting the amounts of remaining monomers and oligomers in the crystalline polyester and suppressing staining within the device.

In the present invention, a resin having a ratio of the softening point to the maximum peak temperature of heat of fusion (softening point/maximum peak temperature of heat of fusion) of from 0.6 to 1.3, preferably from 0.9 to 1.2, more preferably from 0.95 to 1.1, is referred to as "crystalline" resin. Also, a resin having a ratio of the softening point to the maximum peak temperature of heat of fusion (softening point/maximum peak temperature of heat of fusion) of greater than 1.3 and 4.0 or less, preferably from 1.5 to 3.0, is referred to as "amorphous" resin.

1,6-Hexanediol is contained in the alcohol component in an amount of 60% by mol or more, preferably from 75 to 100% by mol, more preferably from 90 to 100% by mol.

The alcohol component other than 1,6-hexanediol includes an aliphatic diol having 2 to 6 carbon atoms such as ethylene glycol, 1,2-propylene glycol, 1,3-propylene glycol, 1,4-butanediol, 1,5-pentanediol, neopentyl glycol and 1,4-butenediol; an aromatic diol such as an alkylene(2 to 3 carbon atoms) oxide adduct (average number of moles added being 1 to 10) of bisphenol A, such as polyoxypropylene(2.2)-2,2-bis(4-hydroxyphenyl)propane and polyoxyethylene(2.2)-2,2-bis(4-hydroxyphenyl)propane; a trihydric or higher polyhydric alcohol such as glycerol, pentaerythritol and trimethylolpropane. Among them, the aliphatic diol having 2 to 6 carbon atoms is preferable, more preferably 1,4-butanediol, from the viewpoint of crystallinity.

Fumaric acid is contained in the carboxylic acid component in an amount of 60% by mol or more, preferably from 60 to 95% by mol, more preferably from 70 to 80% by mol.

Other carboxylic acid is preferably adipic acid, and adipic acid is preferably contained in the carboxylic acid component in an amount of from 5 to 40% by mol, more preferably from 20 to 30% by mol.

The carboxylic acid component other than fumaric acid and adipic acid includes an aliphatic dicarboxylic acid having 2 to 30 carbon atoms, preferably 2 to 8 carbon atoms, such as oxalic acid, malonic acid, maleic acid, citraconic acid, itaconic acid, glutaconic acid, succinic acid, sebacic acid, azelaic acid, n-dodecylsuccinic acid and n-dodecenylsuccinic acid; an aromatic dicarboxylic acid such as phthalic acid, isophthalic acid and terephthalic acid; an alicyclic carboxylic acid such as cyclohexanedicarboxylic acid; a tricarboxylic or higher polycarboxylic acid such as 1,2,4-benzenetricarboxylic acid (trimellitic acid) and pyromellitic acid; and the like. Among them, the aliphatic dicarboxylic acids having 2 to 8 carbon atoms are preferable. Here, the carboxylic acid component includes a carboxylic acid, an acid anhydride thereof, and an alkyl(1 to 3 carbon atoms) ester thereof, among which the carboxylic acid is preferable.

The number of the kinds of the raw material monomers constituting each of the carboxylic acid component and the alcohol component is preferably one or two kinds, more preferably a total of two or three kinds when the numbers of the raw material monomers of both components are combined.

The molar ratio of the carboxylic acid component to the alcohol component (carboxylic acid component/alcohol component) in the crystalline polyester of the present invention is preferably from 0.9 to 1.1, more preferably from 0.95 to 1.05, from the viewpoint of reducing the low-molecular weight component.

The polycondensation of the alcohol component and the carboxylic acid component can be carried out, for instance, by a reaction at a temperature of from 120° to 230° C. in an inert gas atmosphere, using an esterification catalyst, a polymerization inhibitor or the like as occasion demands. Concretely, in order to enhance the strength of the resin, an entire monomer may be charged at once. Alternatively, in order to reduce the low-molecular weight components, divalent monomers may be reacted first, and thereafter trivalent or higher polyvalent monomers may be added and reacted. In addition, the reaction may be accelerated by reducing the pressure of the reaction system in the second half of the polymerization. In order to adjust the softening point and the molecular weight of the crystalline polyester of the present invention, the molar ratio of the carboxylic acid component to the alcohol component may be adjusted as mentioned above, or reaction conditions such as the reaction temperature, the amount of the catalyst, the degree of vacuum, the reaction time, the kinds of raw material monomers and the ratio may be selected. In order to prepare the polyester having a high molecular weight of the present invention, a method of reacting the raw material monomers in the presence of the non-reactive low-viscosity resin and/or the solvent is also an effective means.

Further, the present invention provides a resin binder for a toner containing the crystalline polyester of the present invention, and a toner containing the resin binder.

The crystalline polyester of the present invention is contained in the resin binder in an amount of preferably from 1 to 50% by weight, more preferably from 5 to 40% by weight, even more preferably from 10 to 30% by weight. It is preferable that the resin binder further contains an amorphous resin in addition to the crystalline polyester.

When the crystalline polyester contains two or more resins, it is desired that at least one resin, preferably all the resins, is the crystalline polyester explained above.

The amorphous resin includes amorphous polyesters, amorphous polyester-polyamides, vinyl resins such as amorphous styrene-acrylic resins, hybrid resins, the hybrid resins containing two or more resin components partially being chemically bonded to each other, mixtures thereof, and the like. Among them, from the viewpoints of the fixing ability and the compatibility with the crystalline polyester, the amorphous polyesters and hybrid resins containing an amorphous polyester component and a vinyl resin component are preferable, and the amorphous polyesters are more preferable.

The amorphous polyester can be prepared in the same manner as in the crystalline polyester. Here, in order to prepare an amorphous polyester, it is preferable that the following requirements are met:

1) in a case where monomers for accelerating crystallization of a resin, such as an aliphatic diol having 2 to 6 carbon atoms and an aliphatic dicarboxylic compound having 2 to 8 carbon atoms, are used, crystallization is suppressed by using two or more of these monomers in combination, in each of the alcohol component and the carboxylic acid component, wherein one of these monomers is used in an amount of from 10 to 70% by mol, preferably 20 to 60% by mol of each component, and the monomers are used in combination of two or more, preferably in combination of two to four; or 2) a resin obtained from monomers for accelerating amorphousness of a resin, preferably an alkylene oxide adduct of bisphenol A as an alcohol component, or a substituted succinic acid of which substituent is an alkyl group or alkenyl group as a carboxylic acid component, more preferably an alkylene oxide adduct of bisphenol A, are used in an amount of from 30 to 100% by mol, preferably from 50 to 100% by mol, of the alcohol component or the carboxylic acid component, preferably of the alcohol component and the carboxylic acid component, respectively.

Also, as the raw material monomers for the amorphous polyester-polyamides, in addition to the polyhydric alcohol component and the polycarboxylic acid component described above, in order to form the amide components, polyamines such as ethylenediamine, hexamethylenediamine, diethylenetriamine and phenylenediamine; aminocarboxylic acids such as 6-aminocaproic acid and ε-caprolactam; amino alcohols such as propanolamine; and the like are used. Among them, hexamethylenediamine and ε-caprolactam are preferable.

The amorphous polyester-polyamides can be prepared in the same manner as the amorphous polyester.

The vinyl resin may be obtained by polymerizing a monomer which can be subjected to radical polymerization reaction such as styrene or (meth)acrylic ester or (meth) acrylic acid using a polymerization initiator. Here, the polymerization may be carried out by any of solution polymerization, suspension polymerization, emulsion polymerization, bulk polymerization and the like.

In the present invention, the hybrid resin may be obtained by using two or more resins as raw materials, or it may be obtained by using one resin and raw material monomers of the other resin. Further, the hybrid resin may be obtained from a mixture of raw material monomers of two or more resins. In order to efficiently obtain a hybrid resin, those obtained from a mixture of raw material monomers of two or more resins are preferable.

Therefore, it is preferable that the hybrid resin is obtained by mixing raw material monomers for two polymerization resins each having independent reaction paths, preferably raw material monomers for the condensation polymerization resin and raw material monomers for the addition polymerization resin, and carrying out the two polymerization reactions. Specifically, the hybrid resin disclosed in Japanese Patent Laid-Open No. Hei 10-087839 (U.S. Pat. No. 5,908, 727) is preferable.

Representative examples of the condensation polymerization resin include polyesters, polyester-polyamides, polyamides, and the like, among which polyesters are preferable. Representative examples of the above-mentioned addition polymerization resin include vinyl resins obtained by radical polymerization, and the like.

The amorphous resin has a softening point of preferably from 70° to 180° C., more preferably from 100° to 160° C., and a glass transition temperature of preferably from 45° to 80° C., more preferably from 550 to 75° C. Incidentally, the glass transition temperature is a distinct property of an amorphous resin, and is distinguished from the maximum peak temperature of heat of fusion.

The tetrahydrofuran (THF)-soluble component of the amorphous resin has a number-average molecular weight of preferably from 1500 to 10000, more preferably from 2000 to 5000.

When the amorphous resin contains two or more resins, it is desired that at least one resin, preferably all the resins, is the amorphous polyester explained above. Even more preferably, it is preferable that a low-softening point resin having a softening point of 70° C. or more and less than 120° C. and a high-softening point resin having a softening point of 120° C. or more and 160° C. or less are used together in a weight ratio (low-softening point resin/high-softening point resin) of preferably from 30/70 to 95/5, from the viewpoints of the low-temperature fixing ability and the offset resistance.

The weight ratio of the crystalline polyester to the amorphous resin (crystalline polyester/amorphous resin) is preferably from 1/99 to 50/50, more preferably from 5/95 to 40/60, even more preferably from 10/90 to 30/70, from the viewpoints of the storage property, the low-temperature fixing ability and the durability.

It is preferable that the toner of the present invention may further contains, in addition to the resin binder of the present invention, at least a wax.

The wax includes natural ester waxes such as carnauba wax and rice wax; synthetic waxes such as polypropylene wax, polyethylene wax and Fischer-Tropsch wax; coal waxes such as montan wax; alcohol waxes; and the like. These waxes can be used alone or in admixture of two or more kinds.

The melting point of the wax is preferably from a temperature lower than the softening point (Tm) of the crystalline polyester by 30° C. or less [hereinafter simply referred to as "Tm−30° C."] to a temperature higher than Tm by 20° C. or less [hereinafter simply referred to as "Tm+20° C."], more preferably from [Tm−20° C.] to [Tm+20° C.], more preferably from [Tm−15° C.] to [Tm+15° C.], from the viewpoints of the compatibility with the crystalline polyester and the offset resistance. It is even more preferable that the wax is a natural ester wax having the melting point as defined above.

It is preferable that the wax is contained in an amount of preferably from 0.1 to 5 parts by weight, more preferably from 0.5 to 2 parts by weight, based on 100 parts by weight of the resin binder.

The toner of the present invention may appropriately contain, in addition to the resin binder of the present invention, an additive such as a colorant, a charge control agent, an electric conductivity modifier, an extender, a reinforcing filler such as a fibrous substance, an antioxidant, an anti-aging agent, a fluidity improver, and a cleanability improver.

As the colorant, all of the dyes and pigments which are used as colorants for a toner can be used, and the colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like. These colorants can be used alone or in admixture of two or more kinds. The toner of the present invention can be used as any of black toners, color toners, and full color toners, preferably the full color toner particularly requiring the low-temperature fixing ability. The colorant is contained in an amount of preferably from 1 to 40 parts by weight, more preferably from 3 to 10 parts by weight, based on 100 parts by weight of the resin binder.

The charge control agent includes positively chargeable charge control agents such as Nigrosine dyes, triphenylmethane-based dyes containing a tertiary amine as a side chain, quaternary ammonium salt compounds, polyamine resins and imidazole derivatives, and negatively chargeable charge control agents such as metal-containing azo dyes, copper phthalocyanine dyes, metal complexes of alkyl derivatives of salicylic acid and boron complexes of benzilic acid.

The toner of the present invention may be a toner prepared by any of conventionally known methods such as a pulverized toner obtained by a kneading and pulverization method or the like; a chemical toner obtained by an emulsion phase-inversion method, an emulsion dispersion method or the like; and an encapsulated toner obtained by a seed polymerization method. The pulverized toner obtained by the kneading and pulverization method is preferable from the viewpoints of easily preparing the toner and markedly exhibiting the effects of the present invention. Incidentally, in the case where a toner is obtained by the kneading and pulverization method, the toner can be prepared by homogeneously mixing a resin binder, a wax, a colorant and the like in a mixer such as a Henschel mixer, thereafter melt-kneading with a closed kneader, a single-screw or twin-screw extruder, or the like, cooling, pulverizing, and classifying the product. Further, a fluidity improver such as hydrophobic silica or the like may be externally added to the surface of the toner as occasion demands. The toner has a volume-average particle size ($D_4$) of preferably from 3 to 15 μm.

The toner of the present invention can be used alone as a developer, in the case where fine magnetic material powder is contained. Alternatively, in the case where fine magnetic material powder is not contained, the toner can be used as a nonmagnetic monocomponent developer, or the toner can be mixed with a carrier and used as a two-component developer, even more preferably as a nonmagnetic developer exhibiting an even more remarkable effects of the present invention.

EXAMPLES

The following examples further describe and demonstrate embodiments of the present invention. The examples are given solely for the purposes of illustration and are not to be construed as limitations of the present invention.

[Softening Point]

Softening point refers to a temperature corresponding to ½ of the height (h) of the S-shaped curve showing the relationship between the downward movement of a plunger (flow length) and temperature, namely, a temperature at which a half of the resin flows out, when measured by using a flow tester of the "koka" type ("CFT-500D," commercially available from Shimadzu Corporation) in which a 1 g sample is extruded through a nozzle having a dice pore size of 1 mm and a length of 1 mm, while heating the sample so as to raise the temperature at a rate of 6° C./min and applying a load of 1.96 MPa thereto with the plunger.

[Maximum Peak Temperature of Heat of Fusion and Glass Transition Temperature]

The maximum peak temperature of heat of fusion is determined using a differential scanning calorimeter ("DSC 210," commercially available from Seiko Instruments, Inc.), by raising its temperature to 200° C., cooling the hot sample to 0° C. at a cooling rate of 10° C./min., and thereafter heating the sample so as to raise the temperature at a rate of 10° C./min. The maximum peak temperature is a melting point in a case of a wax. In addition, the glass transition temperature refers to the temperature of an intersection of the extension of the baseline of equal to or lower than the maximum peak temperature and the tangential line showing the maximum inclination between the kick-off of the peak and the top of the peak by the determination mentioned above.

[Number-Average Molecular Weight of Tetrahydrofuran-Soluble Component (Mn of THF-Soluble Component)]

The molecular weight distribution is determined by using gel permeation chromatography (GPC).

The amount 0.25 g of a resin powder is added to 49.75 g of THF in a 100 ml glass bottle with a lid, and the components are mixed with a ball-mill at room temperature for 4 hours. Next, this solution is filled with a fluororesin filter (commercially available from Toyo Roshi Kaisha, Ltd. under the trade name of DISMIC-25-JP having a pore size of 0.2 μm) to exclude an insoluble component, to give a sample solution.

The GPC determination is made by eluting THF as an eluent at a flow rate of 1 ml per minute, stabilizing the column in a thermostat kept at 40° C., and injecting 100 μl of the sample solution to the column. The molecular weight of the sample is calculated on the basis of a calibration curve previously prepared. Here, as the analysis column "GMHLX+G3000HXL" (manufactured by Tosoh Corporation) is used. The calibration curve of the molecular weight is drawn using several kinds of monodisperse polystyrenes as standard samples.

Preparation Examples of Crystalline Polyesters

The raw material monomers as shown in Tables 1 to 3, 4 g of dibutyltin oxide and 2 g of hydroquinone were combined, and the ingredients were reacted at 160° C. in a nitrogen gas atmosphere over a period of 5 hours. Thereafter, the temperature was raised to 200° C., and the ingredients were reacted for 1 hour and further reacted at 8.3 kPa until a resin having a desired molecular weight was obtained, to give Resins a to o.

TABLE 1

|  | Resin a | Resin b | Resin c | Resin d |
| --- | --- | --- | --- | --- |
| 1,4-Butanediol | — | — | — | — |
| 1,6-Hexanediol | 2006 g (100) | 2046 g (102) | 2006 g (100) | 2006 g (100) |
| Fumaric Acid | 1479 g (75) | 1479 g (75) | 1479 g (75) | 1479 g (75) |
| Adipic Acid | 612 g (25) | 612 g (25) | 612 g (25) | 612 g (25) |
| Softening Point (° C.) | 86.3 | 92.5 | 78.2 | 60.4 |
| Maximum Peak Temperature (° C.) of Heat of Fusion | 89.8 | 90.7 | 85.3 | 65.3 |
| Softening Point/Peak Temperature | 0.96 | 1.02 | 0.92 | 0.92 |
| Mn of THF-Soluble Component | 3542 | 6524 | 1719 | 895 |

Note)
The values in parentheses are expressed by molar ratios.

TABLE 2

|  | Resin e | Resin f | Resin g | Resin h | Resin i |
| --- | --- | --- | --- | --- | --- |
| 1,4-Butanediol | — | — | — | — | — |
| 1,6-Hexanediol | 2006 g (100) | 2006 g (100) | 2006 g (100) | 2006 g (100) | 2006 g (100) |
| Fumaric Acid | 1380 g (70) | 1518 g (100) | 1676 g (85) | 1972 g (100) | 1972 g (100) |
| Adipic Acid | 734 g (30) | 612 g (25) | 367 g (15) | — | — |
| Softening Point (° C.) | 78.6 | 85.9 | 93.5 | 113.2 | 87.3 |
| Maximum Peak Temperature (° C.) of Heat of Fusion | 81.1 | 89.1 | 96.3 | 115.3 | 92.0 |
| Softening Point/Peak Temperature | 0.97 | 0.96 | 0.97 | 0.98 | 0.95 |
| Mn of THF-Soluble Component | 3215 | 3065 | 3111 | 4011 | 1215 |

Note)
The values in parentheses are expressed by molar ratios.

TABLE 3

|  | Resin j | Resin k | Resin l | Resin m | Resin n | Resin o |
| --- | --- | --- | --- | --- | --- | --- |
| 1,4-Butanediol | 459 g (30) | 306 g (20) | 1377 g (90) | 1530 g (100) | — | — |
| 1,6-Hexanediol | 1404 g (70) | 1605 g (80) | 201 g (10) | — | 2006 g (100) | — |
| Ethylene Glycol | — | — | — | — | — | 1054 g (100) |
| Fumaric Acid | 1972 g (100) | 1578 g (80) | 1972 g (100) | 1183 g (60) | — | — |
| Adipic Acid | — | 490 g (20) | — | 979 g (40) | 2448 g (100) | 2448 g (100) |
| Softening Point (° C.) | 76.9 | 65.5 | 122.3 | 90.0 | 60.2 | 51.4 |
| Maximum Peak Temperature (° C.) of Heat of Fusion | 80.6 | 69.8 | 125.4 | 95.1 | 65.3 | 62.3 |

TABLE 3-continued

|  | Resin j | Resin k | Resin l | Resin m | Resin n | Resin o |
|---|---|---|---|---|---|---|
| Softening Point/ Peak Temperature | 0.95 | 0.94 | 0.98 | 0.95 | 0.92 | 0.83 |
| Mn of THF-Soluble Component | 3773 | 2875 | 3229 | 3612 | 2982 | 2650 |

Note)
The values in parentheses are expressed by molar ratios.

Preparation Example 1 of Amorphous Polyester

The raw material monomers as shown in Table 4, and 4 g of dibutyltin oxide were combined, and the ingredients were reacted at 220° C. in a nitrogen gas atmosphere over a period of 8 hours. The reaction mixture was further reacted at 8.3 kPa until the desired softening point was attained, to give Resin A.

Preparation Example 2 of Amorphous Polyester

The raw material monomers other than trimellitic anhydride as shown in Table 4, and 4 g of dibutyltin oxide were combined, and the ingredients were reacted at 220° C. in a nitrogen gas atmosphere over a period of 8 hours. The reaction mixture was then further reacted at 8.3 kPa for 1 hour, and thereafter trimellitic anhydride as shown in Table 4 was added to the resulting reaction mixture at 210° C., and the ingredients were reacted until the desired softening point was attained, to give Resin B.

TABLE 4

|  | Resin A | Resin B |
|---|---|---|
| BPA-PO[1] | 490 g (24.9) | 1225 g (51.7) |
| BPA-EO[2] | 845 g (50.0) | 488 g (20.6) |
| Fumaric Acid | — | 464 g (19.6) |
| Terephthalic Acid | 631 g (32.1) | — |
| Trimellitic Anhydride | — | 192 g (8.1) |
| Softening Point (° C.) | 110.6 | 150.3 |
| Maximum Peak Temperature (° C.) of Heat of Fusion | 67.7 | 63.8 |
| Softening Point/Peak Temperature | 1.63 | 2.36 |
| Glass Transition Temperature (° C.) | 64.6 | 61.4 |
| Mn of THF-Soluble Component | 2763 | 3315 |

Note)
The values in parentheses are expressed by weight ratios.
[1]Propylene oxide adduct (average moles added: 2.2 mol) of bisphenol A
[2]Ethylene oxide adduct (average moles added: 2.2 mol) of bisphenol A Examples 1 and 3 to 13 and Comparative Examples 1 to 7

Twenty parts by weight of the crystalline polyester as shown in Table 5, 65 parts by weight of Resin A, 15 parts by weight of Resin B, 1 part by weight of the wax as shown in Table 5, 3.5 parts by weight of a carbon black "MOGUL L" (commercially available from Cabot Corporation) and 1 part by weight of a charge control agent "T-77" (commercially available from Hodogaya Chemical Co., Ltd.) were sufficiently mixed in a Henschel mixer. The mixture was melt-kneaded using a co-rotating twin-screw extruder (entire length of the kneading portion: 1560 mm; screw diameter: 42 mm; barrel inner diameter: 43 mm) by controlling the rotational speed of the roller to 200 r/min., the heating temperature within the roller to 100° C., and the feeding rate of the mixture to 10 kg/h. The outlet temperature for the kneaded product was about 150° C., and the average residence time of the mixture was about 18 seconds. The resulting melt-kneaded product was cooled and roughly pulverized. Subsequently, the resulting product was pulverized with a jet mill and classified, to give a powder having a volume-average particle size ($D_4$) of 8.0 μm. To 100 parts by weight of the resulting powder was added as an external additive 1.5 parts by weight of a hydrophobic silica "Aerosil R-972" (commercially available from Nippon Aerosil), and mixed with a Henschel mixer, to give a toner.

Example 2

The same procedures were carried out as in Example 1 except that 1 part by weight of "LR-147" (commercially available from Japan Carlit) was used as a charge control agent in place of "T-77," and 3.5 parts by weight of a cyan pigment "ECB-301" (commercially available from DAINICHISEIKA COLOR & CHEMICALS MFG. CO., LTD.) were used in place of the carbon black, to give a toner.

Test Example 1

Low-Temperature Fixing Ability and Offset Resistance

Four parts by weight of a toner and 96 parts by weight of a silicon-coated ferrite carrier (commercially available from Kanto Denka Kogyo Co., Ltd., average particle size: 90 μm) were mixed for 10 minutes with a turbuler mixer, to give a developer. Next, the resulting developer was loaded in an apparatus of a copy machine "AR-505" (commercially available from Sharp Corporation, fixing speed: 100 mm/sec) which was modified so that fixing could be carried out externally of the device. The development of fixed images was carried out, by sequentially raising the temperature of the fixing roller from 90° to 240° C. in increments of 5° C. The sheets used for the fixing test were "CopyBond SF-70NA" (commercially available from Sharp Corporation, 75 g/m$^2$).

I. Low-Temperature Fixing Ability

A load of 500 g was applied to a sand-rubber eraser, the eraser having a bottom area of 15 mm×7.5 mm, and was moved backwards and forwards five times over a fixed image obtained at each fixing temperature. The optical reflective densities of the image before and after the eraser treatment were measured with a reflective densitometer "RD-915" (manufactured by Macbeth Process Measurements Co.). The temperature of the fixing roller at which the ratio of (a) the optical density after the eraser treatment to (b) the optical density before the eraser treatment, i.e. (a)/(b), for the first time exceeds 70%, is defined as the lowest fixing temperature. The low-temperature fixing ability was evaluated according to the following evaluation criteria. The results are shown in Table 5. Incidentally, there are some case where the toners were adhered to the fixing roller. This aspect was evaluated by the offset resistance mentioned below.

[Evaluation Criteria]
⊚: A lowest fixing temperature being lower than 110° C.;
○: A lowest fixing temperature being 110° C. or higher and lower than 130° C.; and
×: A lowest fixing temperature being 130° C. or higher.

II. Offset Resistance

Furthermore, the generation of offset was visually observed, and the offset resistance was evaluated according to the following evaluation criteria. The results are shown in Table 5.

[Evaluation Criteria]
The temperature (T) at which the toner does not adhere to the fixing roller is:
⊚: a temperature lower than the lowest fixing temperature plus 10° C. [T<(lowest fixing temperature+10° C.)];
○: a temperature between a temperature equal to or higher than the lowest fixing temperature plus 10° C. and a temperature lower than the lowest fixing temperature plus 20° C. [(lowest fixing temperature+10° C.)≦T<(lowest fixing temperature+20° C.)];
Δ: a temperature between a temperature equal to or higher than the lowest fixing temperature plus 20° C. and a temperature lower than the lowest fixing temperature plus 30° C. [(lowest fixing temperature+20° C.)≦T<(lowest fixing temperature+30° C.)]; and
×: a temperature equal to or higher than the lowest fixing temperature plus 30° C. [(lowest fixing temperature+30° C.)≦T]

Test Example 2

Environmental Stability

Each of the developers prepared in the same manner as in Test Example 1 was allowed to stand for 4 hours under the conditions of 40° C. and 16 kPa, and thereafter cooled with a desiccator to 20° C. Each of the cooled developers was allowed to stand for one day in each of the environmental conditions of a temperature of 20° C. and relative humidity of 55%, or a temperature of 30° C. and relative humidity of 80%. After stirring each developer for 10 minutes, the triboelectric charges were determined using "MODEL 210 HS q/m meter" (commercially available from Trek INC.), and the environmental stability was evaluated. The results are shown in Table 5.

[Evaluation Criteria]
When A is defined as a triboelectric charge obtained after stirring for 10 minutes a developer which is allowed to stand for one day under the conditions of a temperature of 20° C. and relative humidity of 55%, and B is defined as a triboelectric charge obtained after stirring for 10 minutes a developer which is allowed to stand for one day under the conditions of a temperature of 30° C. and relative humidity of 80%,
⊚: B/A is 0.7 or more;
○: B/A is 0.5 or more and less than 0.7; and
×: B/A is less than 0.5.

Test Example 3

Staining in Machine

One gram of toner was placed in a box with a lid of a slide glass, and heated at 180° C. for 10 minutes. The evaporated component adhered to the slide glass was wiped off with 1 g of KBr, and sufficiently mixed, to give a KBr tablet. An infrared absorption spectrum was determined for the prepared KBr tablet, and the evaporation property was evaluated according to the following evaluation criteria. The results are shown in Table 5.

[Evaluation Criteria]
Peaks ascribed to monomers and polymers (peaks near 1720 cm$^{-1}$) is:
⊚: nearly not observed;
○: barely observed; and
×: clearly observed.

Test Example 4

Paper Non-Sticking Ability

Each of the developers prepared in the same manner as in Test Example 1 was loaded in a copy machine "AR-505" (commercially available from Sharp Corporation, fixing temperature: 140° C., fixing speed: 100 mm/sec), and 10 sheets each having a fixed image with a printing ratio of 10% was printed using "CopyBond SF-70NA" (commercially available from Sharp Corporation, 75 g/m$^2$) as sheets to be fixed. The ten sheets with printed fixed images were overlaid on top of each other, and 500 sheets of plain white sheets were placed on top of the 10 sheets, and the sheets were allowed to stand under the conditions of a temperature of 70° C. and relative humidity of 60% for 1 hour, and the paper non-sticking ability was evaluated according to the following evaluation criteria. The results are shown in Table 5.

[Evaluation Criteria]
⊚: even after the sheets were allowed to stand, the papers did not stick to each other, and the staining on the reverse side of the sheets did not take place;
○: while the papers did not stick to each other, there are some staining on the reverse side; and
Δ: papers stuck weakly to each other, and the staining on the reverse side of the sheets took place; and
×: papers stuck to each other and became a single bundle.

TABLE 5

|  | Crystalline Polyester | Wax* | Low-Temp. Fixing Ability | Paper Non-Sticking Ability | Environmental Stability | Suppressive Ability of Staining in Machine | Offset Resistance |
| --- | --- | --- | --- | --- | --- | --- | --- |
| Ex. 1 | Resin a | Carnauba | ⊚ | ⊚ | ⊚ | ⊚ | ⊚ |
| Ex. 2 | Resin a | Carnauba | ⊚ | ⊚ | ⊚ | ⊚ | ⊚ |
| Ex. 3 | Resin a | C-80 | ⊚ | ⊚ | ⊚ | ⊚ | ⊚ |
| Ex. 4 | Resin a | SP-105 | ⊚ | ⊚ | ⊚ | ⊚ | ○ |

TABLE 5-continued

| | Crystalline Polyester | Wax* | Low-Temp. Fixing Ability | Paper Non-Sticking Ability | Environmental Stability | Suppressive Ability of Staining in Machine | Offset Resistance |
|---|---|---|---|---|---|---|---|
| Ex. 5 | Resin a | 550P | ⊚ | ⊚ | ⊚ | ⊚ | △ |
| Ex. 6 | Resin b | Carnauba | ○ | ⊚ | ⊚ | ⊚ | ⊚ |
| Ex. 7 | Resin c | Carnauba | ⊚ | ⊚ | ⊚ | ○ | ⊚ |
| Comp. Ex. 1 | Resin d | Carnauba | ⊚ | ○ | ⊚ | X | ○ |
| Ex. 8 | Resin e | Carnauba | ⊚ | ○ | ○ | ⊚ | ⊚ |
| Ex. 9 | Resin f | Carnauba | ⊚ | ⊚ | ⊚ | ⊚ | ⊚ |
| Ex. 10 | Resin g | Carnauba | ○ | ⊚ | ⊚ | ⊚ | ⊚ |
| Ex. 11 | Resin h | SP-105 | ○ | ⊚ | ⊚ | ⊚ | ⊚ |
| Comp. Ex. 2 | Resin i | Carnauba | ⊚ | ○ | ⊚ | X | ⊚ |
| Ex. 12 | Resin j | Carnauba | ⊚ | ⊚ | ○ | ⊚ | ⊚ |
| Ex. 13 | Resin k | Carnauba | ⊚ | ○ | ○ | ⊚ | ⊚ |
| Comp. Ex. 3 | Resin l | SP-105 | X | ⊚ | X | ⊚ | ⊚ |
| Comp. Ex. 4 | Resin m | Carnauba | ⊚ | △ | X | ⊚ | ⊚ |
| Comp. Ex. 5 | Resin n | Carnauba | ⊚ | X | ○ | ○ | ○ |
| Comp. Ex. 6 | Resin o | Carnauba | ⊚ | X | ○ | ○ | ○ |
| Comp. Ex. 7 | Resin i | 550P | ⊚ | ○ | ⊚ | X | X |

Note:
Carnauba (Carnauba Wax C1): commercially available from K.K. Kato Yoko, melting point: 84° C.
C-80 (PARAFLINT C-80): commercially available from SASOL, polyethylene wax, melting point: 86° C.
SP-105: commercially available from Sazole, Fischer-Tropsch wax, melting point: 105° C.
550P (Viscol 550P): commercially available from Sanyo Kasei, polypropylene wax, melting point: 149° C.

It can be seen from the above results that the toners of Examples have relatively excellent results in all of the low-temperature fixing ability, the paper non-sticking ability, the environmental stability, the suppressive ability of staining in the machine, and the offset resistance, as compared to those of the toners of Comparative Examples.

In the case where the crystalline polyester of the present invention is contained in the resin binder for a toner, there are exhibited some excellent effects that a toner having even more excellent low-temperature fixing ability, and further improved paper non-sticking ability, environmental stability, and staining in the machine can be obtained.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A crystalline polyester prepared by polycondensing an alcohol component comprising 1,6-hexanediol in an amount of 60% by mol or more, with a carboxylic acid component comprising fumaric acid in an amount of 60% by mol or more, wherein the crystalline polyester has a ratio of a softening point to the maximum peak temperature of heat of fusion is from 0.6 to 1.3, and wherein a tetrahydrofuran-soluble component of the crystalline polyester has a number-average molecular weight of from 1500 to 10000, and the crystalline polyester has a softening point of from 50° to 120° C.

2. The crystalline polyester according to claim 1, wherein adipic acid is contained in the carboxylic acid component in an amount of 5 to 40% by mol.

3. The crystalline polyester according to claim 1, wherein one or two kinds of monomers are used as raw material monomers constituting the carboxylic acid component or the alcohol component, respectively.

4. The crystalline polyester according to claim 1, wherein a molar ratio of the carboxylic acid component to the alcohol component is from 0.9 to 1.1.

5. A resin binder for a toner comprising the crystalline polyester of claim 1.

6. The resin binder according to claim 5, wherein the crystalline polyester is contained in an amount of from 1 to 50% by weight.

7. The resin binder according to claim 5, further comprising at least one amorphous resin selected from the group consisting of amorphous polyesters, amorphous polyester-polyamides, vinyl resins and hybrid resins comprising two or more resin components partially being chemically bonded to each other.

8. The resin binder according to claim 7, wherein a weight ratio of the crystalline polyester to the amorphous resin is from 1/99 to 50/50.

9. A toner comprising the resin binder of claim 5.

10. The toner according to claim 9, further comprising a wax having a melting point of from 30° C. below a softening point (Tm) of the crystalline polyester to 20° C. above the softening point [(Tm−30° C.) to (Tm+20° C.)].

11. The toner according to claim 10, wherein the wax comprises a natural ester wax.

12. The toner according to claim 9, wherein the toner is a pulverized toner obtained by a kneading and pulverization method.

13. A method of developing an electrostatic latent image formed in electrophotography, electrostatic recording method or electrostatic printing method using the toner of claim 9.

14. The crystalline polyester according to claim 1, wherein the tetrahydrofuran-soluble component of the crystalline polyester has a number-average molecular weight of from 1500 to 4011.

15. The crystalline polyester according to claim 1, wherein the tetrahydrofuran-soluble component of the crystalline polyester has a number-average molecular weight of from 1719 to 4011.

16. The crystalline polyester according to claim 1, wherein the tetrahydrofuran-soluble component of the crystalline polyester has a number-average molecular weight of from 1719 to 10,000.

* * * * *